J. P. CLARE.
SECONDARY OR STORAGE BATTERY.
APPLICATION FILED SEPT. 23, 1910.
1,017,080.
Patented Feb. 13, 1912.
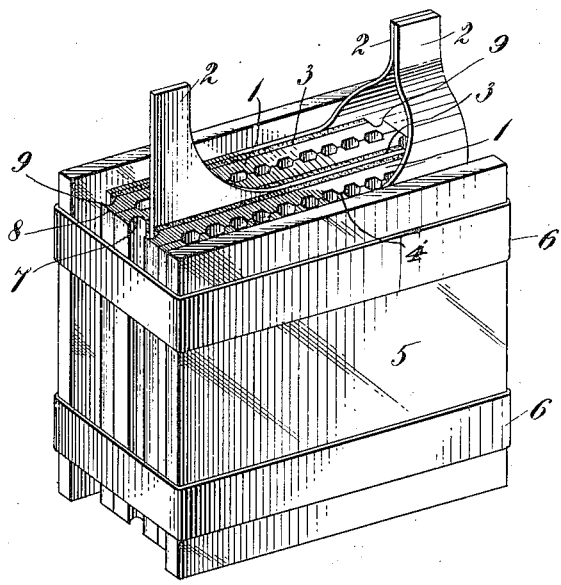
Fig. 1.
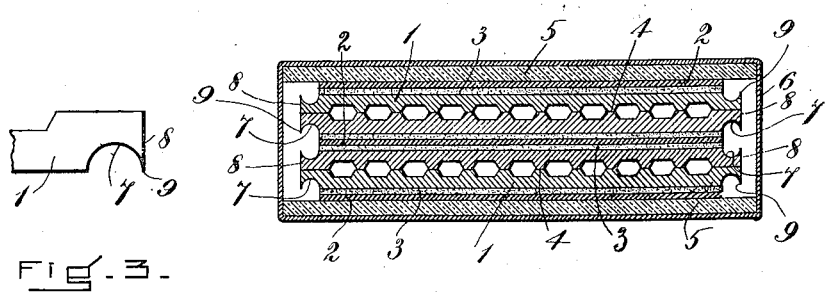
Fig. 3.
Fig. 2.
WITNESSES:
M. E. Flaherty.
George Langton.
INVENTOR:
James P. Clare
by his attys
Clarke Raymond & Coale

UNITED STATES PATENT OFFICE.

JAMES P. CLARE, OF STRATHAM, NEW HAMPSHIRE.

SECONDARY OR STORAGE BATTERY.

1,017,080.

Specification of Letters Patent.   Patented Feb. 13, 1912.

Application filed September 23, 1910.   Serial No. 583,416.

*To all whom it may concern:*

Be it known that I, JAMES P. CLARE, of Stratham, in the county of Rockingham and State of New Hampshire, a citizen of the United States, have invented a new and useful Improvement in Secondary or Storage Batteries, of which the following is a full, clear, and exact description, reference being had to the accompanying drawings, forming a part of this specification, in explaining its nature.

My invention relates especially to and is an improvement upon that class of storage or secondary batteries employing in the unit or element thereof a number of independent porous plates carrying or holding active material in contact with electrodes placed adjacent said plates and between which porous plates an exciting fluid or electrolyte is admitted from the chamber of the jar or vessel in which the porous plates and electrodes are contained. While a battery of this kind is usually effective a difficulty has been found to exist in that the active material during the operation of the battery will expand and escaping from between a plate and adjacent electrode will tend to follow the edges of the plate and plate adjacent to it and creep across to the next electrode causing short-circuiting between positive and negative electrodes. In some cases the active material will creep across the entire end of the element. Attempt has been made to prevent the initial escape of the active material from between the plates and electrodes by parts held against the edges of the plates. While this is effective in preventing such escape yet this expedient is not wholly effective in that it tends to so limit the expansion of the expanding active material as to cause fracture of the porous plates, these plates being ordinarily made of fragile material.

The object of my invention is to prevent the short-circuiting above referred to by preventing the escaping active material from passing along the edges of the plates and forming a connection between electrodes and this, moreover, without preventing the expansion of the active material. As may be seen by reference to the drawings, I accomplish my object by so forming the edges of the porous plates that in order for the escaping active material to pass from one plate to another it must pass over surfaces tending to direct the material away from the edge of the adjacent plate over which it would ordinarily pass and thence abruptly back by an acutely formed edge over which the active material can hardly pass without the continuity of its passage being broken.

Referring to the drawings—Figure 1 is a view in perspective of an element or unit embodying my invention. Fig. 2 is a cross section of the element. Fig. 3 is an enlarged detail showing the edge formation of the porous plates forming a part of the element.

In the drawings 1 represents the porous plates. Between adjacent pairs of these plates or adjacent to single plates are electrodes 2. Between the electrodes and adjacent plates is active material 3 which is borne by the plates and held by them in contact with the electrodes. On their backs the porous plates are provided with ribs 4 which form not only an abutment for adjacent plates placed back to back, but form also channels containing the electrolyte or exciting fluid. The porous plates and electrodes are bound between insulating plates 5 and held by any suitable binder 6. As thus far described the element is one of a common type.

Referring now to the construction of the respective porous plates, it will be observed that each plate is provided along its edges with a curved surface 7 which extends from the extreme lateral point where the porous plate is tending to hold the active material against its electrode, thence back from the plane of the electrode, thence outwardly and inwardly in substantially a direction reverse to the direct line of direction between the electrodes combined in the element and thence back by a surface or edge 8, the surfaces 7 and 8 meeting and thereby forming a very abrupt or acute edge 9.

In the operation of the battery the active material escaping from between any porous plate and the electrode adjacent to it will tend to creep out over the surface 7 which by reason of the direction of its curvature tends to start the escaping material in a direction away from the edge of the next adjacent porous plate and once having taken such direction it cannot turn back over the surface 8 without passing over the abrupt edge 9 and this it cannot do without breaking.

The construction above described is the one I have found the most effective in practice although it is obvious that the construction might be varied and good results obtained without departing from the spirit of my invention. The essential point would seem to reside not so much in curving the edge of the plate but in the formation of the abrupt edge over which the expanding material would have to pass in order to form a connection between the combined electrodes. The fact, also, that before encountering the abrupt or acute edge the expanding material is led in a direction away from the direct line of direction between the combined electrodes is also of importance.

While the expedient shown is a very simple and effective one it is especially good also in that it does not prevent the escape of the expanding active material which, as said before, if prevented from escaping tends to fracture the porous plates; it only tends to take care of the escaping active material and prevent it from doing any harm.

Having thus fully described my invention, I claim and desire to secure by Letters Patent of the United States:—

1. In a secondary or storage battery, the combination of porous plates, electrodes and active material, each of said porous plates along the edges thereof being formed to present an abrupt edge between said electrodes and removed therefrom and from one another.

2. In a secondary or storage battery, the combination of porous plates, electrodes and active material, each of said porous plates along the edges thereof being formed to present between said electrodes surfaces angularly inclined with respect to one another and meeting in an abrupt edge removed from said electrodes and from one another.

3. In a secondary or storage battery, the combination of porous plates, electrodes and active material, each of said porous plates along the edges thereof being formed to present surfaces extending in directions away from the direct line of direction between said electrodes and terminating in an abrupt edge removed from said electrodes and from one another.

4. In a secondary or storage battery, the combination of porous plates, electrodes and active material, said porous plates being formed to present along the edges thereof curved surfaces extending in a substantially reverse direction to the direct line of direction between said electrodes with surfaces also angularly inclined with respect to said curved surfaces and meeting the same in abrupt edges removed from said electrodes.

JAMES P. CLARE.

Witnesses:
GEORGE W. RAND,
ARTHUR S. FRENCH.